`United States Patent Office`  3,460,872
Patented Aug. 12, 1969

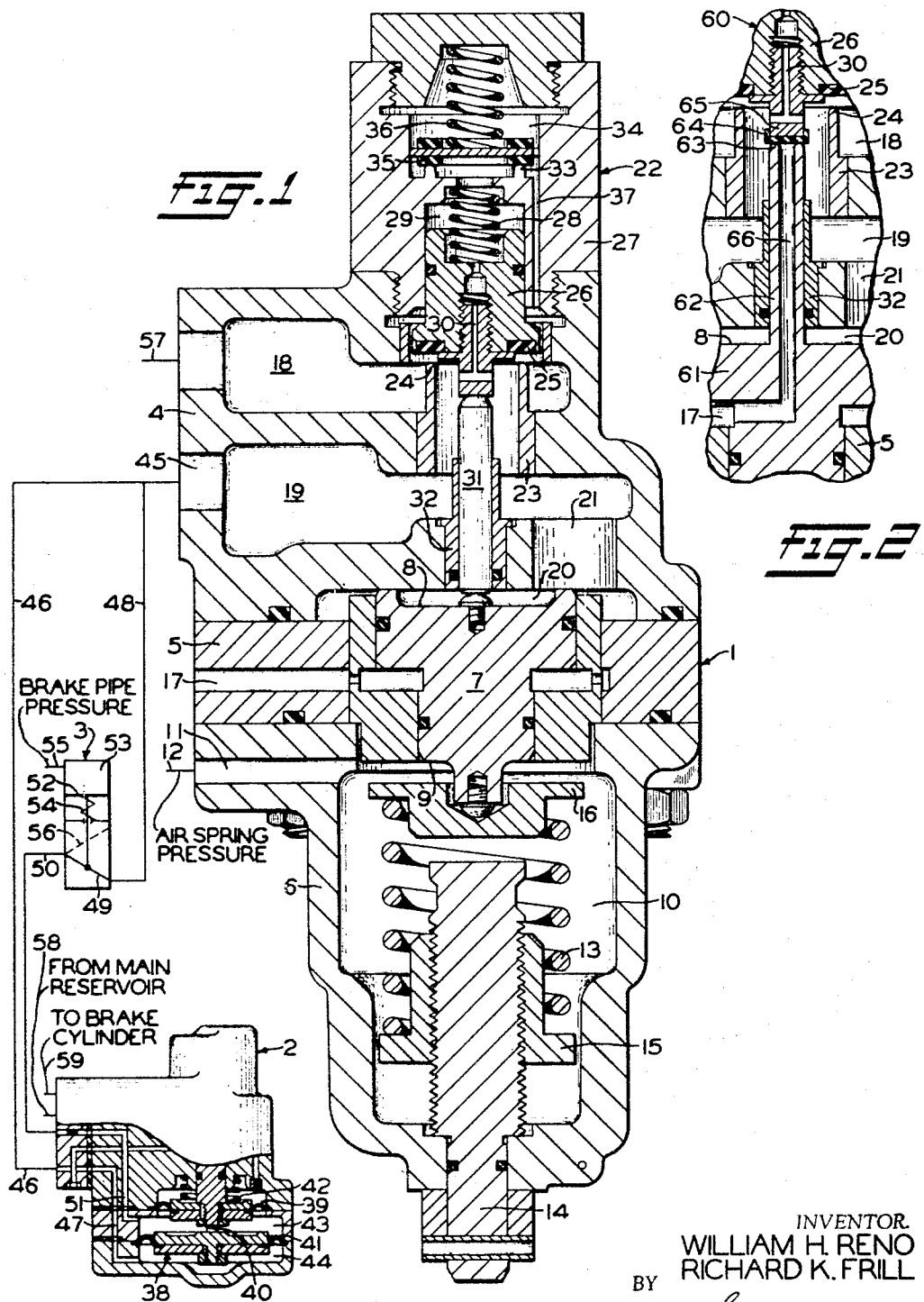

3,460,872
VARIABLE LOAD VALVE DEVICE
William H. Reno, Monroeville, and Richard K. Frill, Pittsburgh, Pa., assignors to Westinghouse Air Brake Company, Wilmerding, Pa., a corporation of Pennsylvania
Filed June 7, 1968, Ser. No. 735,252
Int. Cl. B60t 8/18, 15/02, 11/02
U.S. Cl. 303—22                                11 Claims

ABSTRACT OF THE DISCLOSURE

A variable load valve device for effecting delivery of actuating fluid to a vehicle brake cylinder at a pressure according to a control pressure established by the vehicle operator for effecting a brake application commensurate with the degree of such actuating pressure delivered, said variable load valve device including means for limiting the degree of said actuating fluid to a maximum pressure commensurate with the load condition of the vehicle, and being further characterized by means for automatically maintaining said maximum degree of actuating pressure, once established, but permitting the operator to selectively reduce the degree of said actuating pressure to any degree less than said maximum degree.

Background of the invention

A variable load valve device may be employed when it is desired to automatically limit the degree of a brake application on a vehicle such as a railway car, according to the degree of vehicle load, notwithstanding to what extent the operator moves the brake-applying control lever. By limiting the brake application to a degree corresponding to vehicle load, locking and sliding of the wheels may thus be prevented. Normally, the variable load valve device is cooperatively employed with a main relay valve device so that when, in well-known manner as applies to railway brake equipment, a selected reduction of brake pipe pressure is effected for initiating a brake application, actuating of control fluid at a pressure determined by the degree of reduction in brake pipe pressure is accordingly supplied, through said variable load valve device, to the main relay valve device which, in response to such control fluid pressure, causes fluid under pressure to be supplied to the brake cylinder for effecting a brake application at a degree corresponding to the degree of brake pipe pressure reduction. As is well-known to those skilled in the art, a service application of the brakes is initiated by effecting a preselected reduction of brake pipe pressure commensurate with the degree of service application desired. When fully charged, pressure in the brake pipe may normally be 70 p.s.i., for example, and a maximum or full service application usually requires a brake pipe pressure reduction of 20 p.s.i., which is automatically established by the brake control equipment when the operator moves the control handle to a full service position, thereby leaving brake pipe pressure at 50 p.s.i. To initiate and effect an emergency application, the operator must move the control handle to an emergency position which effects instantaneous reduction of brake pipe pressure to atmosphere. In either case, however, the variable load valve device limits the degree of control pressure delivered to the main relay valve device to a degree commensurate with prevailing vehicle load, so that the resulting brake application is correspondingly limited.

A common type of variable load valve device for controlling brake cylinder pressure according to vehicle load, comprises a piston subjectable on one side to the pressure of control fluid delivered to the main relay valve device, while the other side is subject to the combined forces of a return spring and the vehicle air spring pressure reflecting the load condition of the vehicle. Closing of a check valve in the variable load valve device prevents build-up of control fluid pressure beyond a limited high value corresponding to the degree of vehicle load, such closing of said check valve being effected by shifting of the variable load valve piston in the appropriate direction which occurs when the force of the control fluid pressure acting on the one side of the piston balances the combined forces of air spring pressure and the return spring acting on the other side.

The type of variable load valve device above described will normally function satisfactorily any time that a "service" application of the brakes is effected. As was above noted, the check valve remains open until such time that the force of the control pressure acting on the one side is sufficient for causing the piston to be shifted and, thereby, cause said check valve to be closed. So long as the check valve remains open, the operator may increase or decrease the degree of brake application by simply causing the control pressure acting on the one side of the piston to be increased or decreased, respectively. It should be apparent that should the control pressure thus effected be of such sufficiency as to cause the check valve to close so that the maximum brake application for the prevailing vehicle load would be in effect, any attempt by the operator to increase the degree of application would not succeed. In some situations, however, when it may be necessary to make an emergency application, it may even be desirable to exceed the maximum degree attainable by a service application for a given vehicle load. With the type of variable load valve device above described, an emergency application can be effected only at such time that a full service application is not in effect, that is, only at such time that the check valve is open, as will be explained below.

One type of main relay valve devices frequently used with the type of variable load valve device above described comprises double-diaphragm piston means comprising two pistons, one smaller than the other, responsive to control pressure delivered by the variable load valve device to a plurality of (at least two) disposed adjacent respective pressure areas of said piston means and one or more of which may be charged with said control pressure to obtain the desired effective force acting on said piston means for causing self-lapping valve means included in the relay valve device to effect supply of fluid, at a corresponding pressure, to the brake cylinder.

In order to make an emergency brake application, brake pipe pressure, as above noted, must be reduced all the way down to atmosphere, and, if it is desired that such an emergency application be at a higher degree than the maximum or full service application determined by the variable load valve device for a given load, it is further necessary that the effective force acting on the double-diaphragm piston means be increased accordingy. Such an increase in effective force acting on the piston means is obtained by eliminating control pressure in one of the two control chambers (usually a common control chamber disposed between the two diaphragms), so that the result would be supply of fluid to the brake cylinder at a correspondingly higher pressure than that supplied for a full service application. The common control chamber, in the usual arrangement, is normally charged with control pressure through a normally open secondary relay valve device interposed between the variable load valve device and the main relay valve device, said secondary relay valve device being maintained in an open position by brake pipe pressure connected thereto. The secondary relay valve device is operable responsively to reduction of brake pipe pressure to atmosphere (when an emergency application is initiated) to a closed position in which the common control chamber of the main relay valve device is cut off from control pressure delivery and is vented to atmosphere. The net result of voiding the common control chamber of control pressure is a coresponding increase in effective pressure area of the double-diaphragm piston means, so that the effectiveness of the force of control pressure acting thereon is correspondingly increased to produce a greater displacement of said piston means and, therefore, a corresponding increase in the volume of the other chamber, which may be called the main control chamber and which is still charged with control pressure.

If the check valve in the variable load valve device is open at the time an emergency application is initiated, control pressure is delivered to the main control chamber in the main relay valve device to produce the results immediately above described and, therefore, effect a brake application of a higher degree than the maximum service application for a given load, because operation of the self-lapping valve means in said main relay valve device for cutting off supply of fluid under pressure to the brake cylinder occurs at a higher pressure corresponding to the greater effective force of the control pressure acting on the double-diaphragm piston means. Of course, the maximum degree of control pressure which can be delivered to the main control chamber of the main relay valve device is limited to that value which causes the piston in the variable load valve device to shift to its cut-off position for closing the check valve, as above explained.

If, on the other hand, the check valve of the variable load valve device is already closed (because a maximum service application is already in effect according to the given load) when an attempt at initiating an emergency application is made, the common control chamber in the main relay valve device is again voided of control pressure through the secondary relay valve device. Due to the resultant increase in effective area of the double-diaphragm piston means, as above described, said piston means, with control pressure in the main control chamber acting thereon, will be displaced accordingly to thereby increase the volume of said main control chamber. But, since the check valve of the variable load valve device is seated, control pressure in the main control chamber and in any pipes connecting it to the variable load valve device is isolated. If the combined volume of the main control chamber (before displacement of the double-diaphragm piston due to venting of the common control center) and the pipes connected thereto is relatively small, the increase in volume of the main control chamber (after venting of the common control chamber), in proportion to said combined volume, may be sufficiently great as to critically affect the degree of control pressure isolated in said combined volume, that is, to cause enough of a drop in said control pressure as to actually cause the self-lapping valve means in the main relay valve device to reduce the pressure of fluid supplied to the brake cylinder. Such results would be directly opposite to those desired.

Summary of the invention

The object of the present invention, therefore, is to provide a variable load valve device for delivering control fluid to the main relay valve device, during a service application at a pressure corresponding to the degree of brake application initiated, and to characterize said variable load valve device with check valve means for limiting such control pressure to a maximum degree corresponding to the prevailing vehicle load, said variable load valve device being further characterized by pressure maintaining means for maintaining the pressure of said control fluid at the degree corresponding to the brake application in effect, notwithstanding that an emergency brake application may be initiated and effected at such time that the pressure of control fluid then prevailing is at said maximum degree.

The invention comprises an improved variable load valve device having the usual differential piston and check valve means effective for cutting off control pressure delivered to a relay valve device, which effects a brake application according to such control pressure delivered thereto by the variable load valve device, said piston means being operable to cause said check valve to cut off control fluid delivery to the relay valve device at a maximum pressure to provide a maximum brake application commensurate with vehicle load, such cut-off control pressure occurring when the force of control pressure acting on the one side of the piston prevails over the force of air spring pressure, possibly combined with that of a biasing spring, acting on the opposite side. According to the invention, the check valve is so arranged that, when seated, the forces of control pressure acting on opposite sides thereof are in a balanced state, thereby requiring a biasing spring of nominal compression rating for retaining said check valve in its seated position and also rendering the check valve less resistible to being unseated by the differential piston in the event there is a drop, for any reason, of control pressure acting on said piston, notwithstanding that such a drop in control pressure is relatively minimal, such as less than 10 p.s.i., for example. Unseating of the check valve permits restoration of control pressure delivered to the relay valve device to the degree originally established by the variable load valve device.

In order to effect an intentional reduction of control fluid delivery to the relay valve device, the improved variable load valve device also is provided with a normally seated release or pilot valve subject on one side to pressure of control fluid on the supply side of the check valve and on the opposite side to pressure of control fluid on the delivery side of said check valve. Thus, if a reduction of pressure of control fluid on the supply side of the check valve is made, such reduction would also be effected on the one side of the release valve, which would then be unseated by pressure acting on the opposite side to thereby effect release of pressure on the supply side of the check valve is made, such reduction would also be effected on the one side of the release valve, which would then be unseated by pressure acting on the opposite side to thereby effect release of pressure on the supply side of the check valve and consequent unseating thereof to permit a corresponding reduction in pressure of control fluid delivered to the relay valve device.

Self-lapping valve means may be incorporated in the improved variable load valve device for maintaining the pressures on the supply and delivery sides of the check valve equalized in the event that pressure should leak past the check valve to the delivery side thereof and tend to build up such pressure beyond the desired degree.

In the drawing, FIG. 1 shows a schematic arrangement of a variable brake apparatus including an improved variable load valve device, in section and embodying the invention; and FIG. 2 is a fragmentary view, in section, of a modified form of the variable load valve device embodying the invention.

Description and operation

As shown in FIG. 1, an improved variable load valve device embodying the invention is designated generally by the reference numeral 1. For the purpose of illustrating the manner in which the improved variable load valve device 1 may be utilized, a main relay valve device 2 and a secondary relay valve device 3 are connected, in a manner to be more fully described hereinafter, to said load valve device.

The variable load valve device 1 comprises, as viewed in the drawing, an upper casing section 4, an intermediate casing section 5, and a lower casing section 6.

A valve-operating piston 7, reciprocably mounted in the intermediate casing section 5, has an upper or control pressure area 8 disposed at the end adjacent the upper casing section 4 and a lower or air spring pressure area 9 disposed at the end adjacent the lower casing section 6, said air spring pressure area being smaller than the control pressure area.

The air spring pressure area 9 is exposed and subject to air spring pressure in a chamber 10 formed in the lower casing section 6 and charged with such air spring pressure via a passageway 11, which is connected to the vehicle air springs (not shown) via a pipe 12. The degree of air spring pressure in chamber 10, therefore, reflects the existing vehicle load. A biasing or tuning spring 13 cooperates with air spring pressure in chamber 10 for urging piston 7 toward a supply position (to be defined hereinafter). The compression of spring 13 is adjustable by an adjusting screw 14 arranged for adjusting the axial position of a spring seat 15 relative to an oppositely disposed spring seat 16 resting against the lower end of piston 7, said spring being compressibly disposed between said spring seats. An atmospheric vent 17 is provided in casing section 4 to permit freedom of movement of piston 7.

The upper casing section 4 has a control fluid supply chamber 18 and a control fluid delivery chamber 19 formed therein. The upper casing section 4 also cooperates with the intermediate casing section 5 and the piston 7 therein to define a piston chamber 20 connecting with delivery chamber 19 via a passageway 21, the control pressure area 8 of said piston being open to prevailing fluid pressure in said delivery chamber and said piston chamber. A check and release valve assemblage 22 disposed in the upper casing section 4 cooperates (in a manner to be hereinafter disclosed) with the piston 7 for controlling communication and flow of fluid under pressure between the supply chamber 18 and the delivery chamber 19.

The check and release valve assemblage 22 comprises a check valve seat member 23 fixed in a separating wall of the upper casing section 4 between supply chamber 18 and delivery chamber 19, said seat member having an annular seat 24 formed thereon and on which a check valve 25 is intended to seat when in a seated or closed postion in which communication between said chambers is cut off, said communication being open, of course, in an unseated or open position of said check valve. The check valve 25 is carried on a valve-carrying member 26 axially slidably disposed in an extended portion 27 of the upper casing section 4. A check valve spring 28 disposed in a spring chamber 29 formed in the extended portion 27 serves to bias the valve-carrying member 26 and the check valve 27 toward the seated position of the check valve on seat 24, said valve-carrying member having a passageway 30 extending therethrough for communicating the upper and lower sides thereof, as viewed in the drawing, with each other so that fluid pressure on the lower side may equalize on the upper side.

A piston stem 31 is slidably disposed in a guide bushing 32 fixed in an end wall of upper casing section 4 adjacent intermediate casing section 5, said piston stem being axially aligned between the upper side of piston 7 and the lower side of the valve-carrying member 26, whereby upward movement of said piston to a supply position causes upward movement of said piston stem to thereby lift check valve 25 off seat 24 to its unseated position, and downward movement of the piston, along with the stem, to a cut-off position (to be hereinafter defined) renders spring 28 effective for biasing said check valve to its seated position.

An annular valve seat 33 is formed in the extended portion 27 of upper casing section 4 between spring chamber 29 and a release valve chamber 34, also formed in said extended portion, and is disposed in surrounding relation to an opening connecting the two chambers. A release valve 35 disposed in valve chamber 34 is urged toward a seated position on valve seat 33 by a release valve spring 36 also disposed in said valve chamber. A passageway 37 formed in the extended portion 27 of section 4 provides constant communication between supply chamber 18 and release valve chamber 34.

The main relay valve device 2, which is controlled by the load valve device 1 for effecting supply of fluid under pressure to the brake cylinder device and relief of such fluid under pressure therefrom, is a standard type relay valve device comprising a compound diaphragm type piston 38 having a smaller area piston 39 connected by a common stem 40 to a larger area piston 41, the entire piston assemblage being biased by a spring 42 toward an exhaust position in which fluid under pressure is released from the brake cylinder device (not shown). A common control chamber 43 is disposed between the diaphragm pistons 39 and 41, whereas a main control chamber 44 is disposed adjacent the side of the larger area piston opposite said common control chamber. Thus, if both chambers 43 and 44 are charged with fluid at the same pressure, the smaller piston 39 only is opposingly effective against the biasing action of spring 42, because the forces of fluid pressure acting on the opposite sides of the larger piston 41 are balanced, thereby rendering said larger piston ineffective. If the main control chamber 44 only is charged, however, then the larger piston 41 is opposingly effective against the biasing action of spring 42.

The main control chamber 44 is connected to the delivery chamber 19 of the variable load valve device 1 via a port 45 in said variable load valve device, a pipe 46, and a passageway 47 in the relay valve device 2. The common control chamber 43 is normally also connected to the delivery chamber 19 of the load valve device 1, but through a branch pipe 48 from pipe 46, a communication, represented by a solid line 49, in the secondary relay valve device 3, a pipe 50, and a passageway 51 in the main relay valve device 2.

The secondary relay valve device, 3, which is represented in diagrammatical outline form, comprises a piston 52 subject on one side to brake pipe pressure in an adjacent chamber 53 and on the opposite side to the opposing force of a spring 54. Chamber 53 is charged with brake pipe pressure from a brake pipe 55, said brake pipe pressure, as above noted, being normally 70 p.s.i. Piston 52 is normally maintained by fluid in chamber 53 at a pressure in excess of a certain degree, in a supply position in which communication 49 between pipes 48 and 50 is open. The compression rating of spring 54 is such that a reduction of fluid pressure in chamber 53 (that is, brake pipe pressure) in excess of 20 p.s.i. (or in excess of that required for a maximum service application, as above explained) must be effected before said spring is able to shift piston 52 to an exhaust position in which communication 49 is closed and an exhaust or atmospheric communication, represented by a broken line 56, is opened. With exhaust communication 56 open, chamber 43 of the main relay valve device 2 is vented to atmosphere via passageway 51, pipe 50, and said exhaust communication. Thus, shifting of piston 52 from its supply position to its exhaust position occurs only when an emergency brake application is initiated since brake pipe pressure (and therefore, pressure in chamber 53), in this instance, is reduced to a degree in excess of 20 p.s.i. (actually, to atmosphere).

In operation, it will be assumed that chamber 10 of the variable load valve device 1 is charged with fluid at a certain pressure corresponding to that in the air springs (not shown) as determined by the load condition of the vehicle. If, for example, the operator initiates a full service application of the vehicle brakes by effecting a reduction of brake pipe pressure (which reduction, as above noted, cannot exceed 20 p.s.i. for any service application), a brake control valve device (not shown) on the vehicle, in response to such reduction, causes control fluid, at a pressure according to the degree of reduction effected, to be supplied via a pipe 57 to supply chamber 18 of the variable load valve device 1. Since, at this time, piston 7, acting through stem 31, is holding check valve 25 in its unseated position, fluid under pressure flows past the unseated check valve to delivery chamber 19 whence it flows through pipe 46 and passageway 47 to chamber 44 of the main relay valve device 2, and through pipe 48, secondary relay valve device 3, pipe 50 and passageway 51 to chamber 43 of said main relay valve device.

With both chambers 43 and 44 charged with control pressure, the piston 38 of the main relay valve device 2 is moved upwardly, as viewed in the drawing, to a supply position by the force of pressure acting on the smaller piston 39 only (since the effectiveness of the larger piston 41 is neutralized, as above explained) to cause self-lapping valve means (not shown) in said main relay valve device to open communication between a pipe 58 leading from a source of fluid under pressure such as a main reservoir (not shown) and a pipe 59 leading to a brake cylinder device (not shown), and thereby, in well-known manner, effect supply of actuating fluid at a pressure determined by the degree of control pressure acting on said smaller piston only.

Assuming that the vehicle on which the full service brake application has been made in an empty car, air spring pressure in chamber 10 of the load valve device 1 is accordingly at a minimum degree corresponding to the empty load. Under such conditions, it can be assumed that control pressure in delivery chamber 19 acting on control pressure area 8 of piston 7 and at any degree less than that required for a full service application, is sufficient for overcoming the combined opposing forces of air spring pressure in chamber 10 and of spring 13, to thereby cause said piston to be shifted to its cut-off position in which spring 28 and control pressure communicated through passageway 30 and acting on the upper side of valve-carrying member 26, are effective for seating check valve 25 on valve seat 24 to cut off further control pressure to delivery chamber 19 and main relay valve device 2.

It should also be noted that control pressure prevailing in supply chamber 18 is also communicated via passageway 37 to the upper side of release valve 35 for a purpose to be hereinafter set forth.

Of course, when a maximum service application is in effect for the given load condition, the degree of such a service application cannot be increased for reasons set forth hereinbefore, unless an emergency application is initiated, which situation will be discussed later.

The degree of application can be reduced, however, by simply reducing the degree of control pressure in supply chamber 18 to a degree less than that required for shifting piston 7 from its supply position to its cut-off position. A reduction of control pressure in supply chamber 18, as effected by the operator, is also reflected on the upper side of release valve 35, since said upper side is connected to said chamber via passageway 37, whereupon said valve is unseated by pressure acting on the lower side thereof. With release valve 35 in an unseated position, control pressure in chamber 29 as well as in delivery chamber 19 is accordingly reduced, the latter via passageway 30 and chamber 29, thence both through passageway 37, supply chamber 18 and pipe 57. With reduction of control pressure in delivery chamber 19 and, therefore, of such pressure acting on pressure area 8 of piston 7, said piston and piston stem 31 are biased upwardly by spring 13 and air spring pressure in chamber 10 to move check valve 25 to its unseated position, whereby control pressure in delivery chamber 19 and in control chambers 43 and 44 of the main relay valve device 2 rapidly adjusts to the reduced degree. The self-lapping valve means (not shown) of relay valve device 2 operates responsively to the reduction of control pressure in chambers 43 and 44 to effect a corresponding reduction of actuating pressure in the brake cylinder (not shown).

Anytime that the check valve 25 is in its unseated position, initiation of an emergency application will simply result in complete reduction of pressure in chamber 53 of the secondary relay valve device 3 to thereby cause the common control chamber 43 of the main relay valve device 2 to be vented to atmosphere, as above explained. At the same time, maximum control pressure is established in supply chamber 18 of the variable load valve device 1, and, therefore, in delivery chamber 19 and the main control chamber 44 of the main relay valve device 2 for effecting a maximum emergency brake application in the manner above described.

On the other hand, as was explained above in connection with heretofore known variable load valve devices, if an emergency application is initiated during such time that a full service application is in effect, that is, at a time at which the check valve of the variable load valve device is in its seated position, such action would probably result in an undesirable pressure reduction in the main control chamber 44 of the main relay valve device 2 (due to displacement of piston 38 and consequent expansion of the volume of said main control chamber when chamber 43 is vented to atmosphere as a result of complete reduction of brake pipe pressure in chamber 53 of the secondary relay valve device 3). Such untimely reduction of pressure in the main control chamber 44 would, therefore, result in an undesirable reduction in the existing brake application rather than an increased application, because the old type variable load valve device is not capable of compensating for the pressure drop in said main control chamber.

With the present invention, however, that is, the improved variable load valve device 1, an emergency application initiated at such time that a full service application is in effect, becomes fully effective, notwithstanding that a pressure drop may occur in control chamber 44 of the main relay valve device 2 and that the check valve 25 of said variable load valve device is in its seated position when said emergency application is initiated.

As was previously noted, passageway 30 communicates delivery chamber 19 with the upper side of valve-carrying member 26, so that instead of being subject to pressure in supply chamber 18, as would normally be the case with the old type variable load valve device, said upper side is subject to pressure in the main control chamber 44 and, therefore, in delivery chamber 19, is also effective on the upper side of the valve-carrying member less resistible to upward movement imparted thereto by upward movement of piston 7 reacting to a resulting pressure differential caused by the same pressure drop or reduction on the pressure area 8. Upward movement of the valve-carrying member 26 causes the check valve 25 to be unseated to permit reestablishment of control pressure in delivery chamber 19 and the main control chamber 44 at a degree corresponding to that established in supply chamber 18 by initiation of the emergency application. With the common control chamber 43 of the main relay valve device 2 vented to atmosphere and with the main control chamber 44 charged with maximum control pressure, the larger piston 41 becomes effective for opening the self-lapping valve means (not shown) of said main relay valve device to cause actuating pressure to be supplied to the brake cylinder accordingly so as to effect an emergency application.

In the manner above described, therefore, the variable load valve device 1 will function to permit an emergency application of a greater degree than a maximum full service application for the given load condition, even though a full service application is in effect at the time said emergency application is initiated.

The embodiment shown in FIG. 2 comprises a modified variable load valve device 60, the purpose of which is to provide a variable load valve device which may be used with railway equipment on which the maximum control pressure requirements are the same for both the full service application and the emergency application, thus possibly eliminating the necessity of the compound diaphragm type relay valve device 2 and the secondary relay valve device 3. This may be done by incorporating self-lapping valve means in the variable load valve device.

As shown in FIG. 2, the variable load valve device 60 comprises a valve-operating piston 61 similar to the piston 7 shown in FIG. 1, except that piston 61 is provided with a hollow stem 62 rigidly affixed thereto in place of the floating stem 31 shown in FIG. 1. The free end of hollow stem 62 opposite to the end affixed to piston 61 forms an annular valve 63 adapted to seat (when the piston is in a supply position corresponding to the supply position of piston 7) on a valve seat 64 fixed to a lower projection 65 of the valve-carrying member 26. The valve 63 surrounds one end of a passageway 66 extending through the hollow stem 62 with the other end of said passageway opening to atmospheric vent 17. Other than the differences immediately above set forth, the variable load valve device 60 is identical in structure to the variable load valve device 1, and, therefore, reference to the common components will apply to both devices.

The modified variable load valve device 60, similarly to variable load valve device 1, has control pressure supply (from the control valve device above mentioned but not shown) connected via pipe 57 to supply chamber 18, whereas delivery chamber 19 is connected directly to the brake cylinder (not shown) via pipe 46 for delivering what, in this case, can be called actuating pressure thereto. The operation of the variable load valve device 60 is similar to that of the variable load valve device 1, as above described, that is, control pressure established in supply chamber 18, either for a service application or an emergency application flows past the unseated check valve 25 and is delivered to the brake cylinder via delivery chamber 19 up to a maximum pressure determined by movement of piston 61 to its cut-off position if such control pressure is sufficient for overcoming the opposing forces of spring 13 and air spring pressure in chamber 10.

Normally an emergency application establishes fluid pressure in supply chamber 18 and delivery chamber 19 at a degree sufficient for moving piston 61 to its cut-off position and, therefore, delivery of actuating fluid to the brake cylinder at the maximum pressure, whereas, control fluid pressure effected by a service application could be either less than the maximum pressure, so that piston 61 would remain in its supply position and check valve 25 in its unseated position, or it could be at maximum pressure if a full service application is initiated. Thus, whether the application initiated by the operator is a full service application or an emergency application, either of such applications would effect establishment of fluid pressure on pressure face 8 of piston 61 sufficient for moving said piston downwardly until the opposing forces acting on said piston are balanced and the piston is in its cut-off position in which check valve 25 is in its seated position to cut off further flow of control fluid therepast. Also, with piston 61 in a balanced state, valve 63 on stem 31 is seated on the valve seat 64 to prevent flow of actuating pressure from delivery chamber 19 to atmosphere. Of course, with valve 25 in its seated position, any further attempt on the part of the operator to initiate a heavier brake application by effecting an increase in the degree of control pressure in supply chamber 18, is aborted by the seated check valve.

Notwithstanding, however, that the seated check valve 25 normally prevents control pressure in supply chamber 18 from flowing into delivery chamber 19, even if such control pressure is at a higher degree than the maximum pressure established by the existing vehicle load condition, it is still possible that control pressure at said higher degree might leak past the check valve if the valve fails to seat properly, or if the valve or the valve seat 24 are defective. If such were to occur, the higher pressure thus leaking into delivery chamber 19 and, therfore, effective on pressure area 8 of piston 61, would unbalance the forces acting on said piston and cause it to move downwardly so that valve 63 would be unseated from seat 64. Excess fluid pressure in delivery chamber 19 would thus be permitted to escape to atmosphere via passageway 66 and atmospheric vent 17 until the balance of forces acting on piston 61 and consequent reseating of valve 63 on seat 64 were reestablished. It is apparent, therefore, that the self-lapping means shown in the variable load valve device 60 in FIG. 2 and above described operates automatically for maintaining actuating pressure in delivery chamber 19 and in the brake cylinder at the maximum pressure established according to the prevailing load condition.

Having now described the invention, what we claim as new and desire to secure by Letters Patent, is:

1. In variable load brake control apparatus for effecting supply of actuating fluid under pressure to a brake cylinder of a vehicle and for limiting the pressure of such actuating fluid to a maximum degree in accordance with the vehicle load, the combination of:
    (a) relay valve means operable responsively to control fluid under pressure delivered thereto for effecting supply of actuating fluid to the brake cylinder at a pressure according to that of said control fluid,
    (b) conduit means via which control fluid under pressure may be delivered to said relay valve means, and
    (c) a variable load valve device interposed in said conduit means and comprising:
        (i) check valve means biased toward a closed position in which communication through said conduit means is closed and being operable to an open position in which said communication is open,
        (ii) piston means urged in one direction, responsively to a fluid pressure force determined by the vehicle load, to a supply position for operating said check valve means to its open position and being movable in a direction opposite to said one direction, in response to a force of said control fluid under pressure sufficient for balancing that of said fluid pressure force, to a cut-off position for effecting operation of said check valve means to its said closed position and limiting the pressure of control fluid delivered to said relay means to a maximum pressure determined by the existing fluid pressure force, and
        (iii) passage means via which the pressure of said control fluid delivered to the relay valve means and acting on one side of said check valve means is communicated to the other side thereof for providing a balanced pressure state of the fluid pressure acting on the check valve means and thereby a reduced resistance to movement thereof from its said closed position to its said open position by movement of said piston means to its said supply position responsively to a reduction of control fluid pressure acting thereon.

2. The combination set forth in claim 1 wherein said relay valve means comprises pressure responsive means having a variable effective pressure area certain portions of which are subjected to said control fluid under pressure via said conduit means while certain other portions are selectively subjected to said control fluid pressure for effecting supply of actuating fluid to the brake cylinder according to the amount of effective pressure area subjected to said control pressure, notwithstanding operation of said check valve means to its closed position and consequent limitation of said control pressure to said maximum pressure.

3. The combination, as set forth in claim 2, further characterized by means for selectively subjecting said certain different portions of said variable effective pressure area to said control fluid pressure.

4. The combination set forth in claim 3 further characterized by a brake pipe normally charged with fluid at a predetermined pressure, said means for selectively subjecting said certain different portions of said variable effective pressure area to said control fluid pressure being controlled by the fluid pressure in said brake pipe.

5. The combination, as set forth in claim 4, further characterized by:
    (a) second conduit means via which said control fluid under pressure may be delivered to said certain other portions of said variable effective pressure area concurrently with that delivered through said first-mentioned conduit means to said certain portions for affecting said variable effective pressure area to an extent necessary for establishing the pressure of actuating fluid supplied to the brake cylinder at a certain degree, and
    (b) pressure responsive valve means interposed in said second conduit means and being operative responsively to fluid pressure in said brake pipe for normally maintaining communication through said second conduit means open, said pressure responsive valve means being operable in response to a brake pipe pressure reduction in excess of a predetermined amount for closing communication through said second conduit means and causing the amount of said variable effective pressure area affected by said control pressure to be increased to an extent necessary for effecting supply of actuating fluid to the brake cylinder device at a pressure greater than said certain degree.

6. The combination, as set forth in claim 1, wherein said variable load valve device further comprises pilot valve means subjected on one side to the pressure of control fluid supplied to the variable load valve device and on the opposite side to the pressure of control fluid acting on said check valve means, said pilot valve means being effective, upon a reduction in pressure of said control fluid acting on said one side thereof, for effecting release of control fluid pressure acting on one side of said check valve means an consequent operation thereof to its open position in which control fluid pressure acting on said piston means is accordingly reduced and consequent movement of said piston to its said supply position occurs for maintaining said check valve means in said open position.

7. The combination, as set forth in claim 6, wherein said variable load valve device is further characterized by pressure-maintaining valve means comprising co-operating members, one member being carried by said piston means and another member carried by said check valve means, said pressure-limiting valve means being operable by displacement of the piston means relative to the check valve means, incidental to a build-up of said control fluid pressure acting on said piston means to a degree exceeding said maximum pressure, to an open position for venting said control fluid pressure acting on said piston means to atmosphere, said piston means being effective upon restoration of control fluid pressure to said maximum pressure for restoring said pressure-maintaining valve means to a closed position in which such venting of control fluid pressure to atmosphere is terminated.

8. A pressure-limiting valve device for limiting the pressure of actuating fluid delivered to a fluid pressure responsive device to a maximum pressure determined by a pre-established fluid pressure, said pressure-limiting valve device comprising:
    (a) a casing having formed therein:
        (i) a supply chamber to which actuating fluid for the fluid pressure responsive device is supplied at a selected pressure,
        (ii) a delivery chamber from which said actuating fluid is delivered to the fluid pressure responsive device, and
        (iii) a pressure chamber charged with the pre-established fluid pressure,
    (b) check valve means disposed in said casing between said supply chamber and said delivery chamber for controlling communication therebetween,
    (c) biasing means for urging said check valve means toward a closed position in which communication between said supply chamber and said delivery chamber is closed, said check valve means being operable to an open position in which said communication is open to provide delivery of actuating fluid to the fluid pressure responsive device at the selected pressure,
    (d) a piston member disposed in said casing and having one side thereof subject to actuating fluid pressure in said delivery chamber and the opposite side subject to pre-established fluid pressure in said pressure chamber,
    (e) operating means operatively connecting said piston member to said check valve means,
        (i) said piston member being normally biased in one direction by the force of said pre-established fluid pressure toward a supply position in which said operating means effects operation of said check valve means to its said open position,
        (ii) said piston member being operable in an opposite direction relative to said one direction, when the force of said actuating fluid presure in said delivery chamber acting on said piston member is sufficient for balancing said force of the pre-established fluid pressure, to a cut-off position in which said biasing means is rendered effective for operating said check valve means to its said closed position and thereby limiting the pressure of said actuating fluid delivered to the pressure responsive device to a maximum pressure according to said pre-established pressure, and
    (f) passage means via which the pressure of said actuating fluid prevailing in the delivery chamber and acting on one side of said check valve means is communicated to the other side thereof for providing a balanced state of the fluid pressure acting on said check valve means and thereby a reduced resistance of said check valve means to operation thereof from its said closed position to its said open position upon occurrence of a reduction of the actuating fluid pressure in said delivery chamber.

9. A pressure-limiting valve device, as defined in claim 8, further characterized by spring means for exerting a predetermined force on said piston member for biasing the piston member in said one direction.

10. A pressure-limiting valve device, as defined in claim 8, further characterized by:
    (a) a pilot valve member disposed in said casing and subject in opposing relation to the pressure of actuating fluid prevailing in said supply chamber and to the pressure of actuating fluid prevailing in said delivery chamber and acting on said others side of said check valve means,
    (b) a biasing spring acting on one side of said pilot valve member for exerting a force thereon, jointly with the prevailing actuating fluid pressure in said supply chamber, for urging said pilot valve member to a seated position,
    (c) said pilot valve member being operable from said seated position to an unseated position, upon occurrence of a sufficient preselected reduction of actuating fluid pressure in said supply chamber and consequent predominence of actuating fluid pressure in the delivery chamber, in which unseated position of said pilot valve member actuating fluid pressure acting on said other side of said check valve means is released therefrom to cause operation thereof to its said open position for effecting a reduction of actuating fluid pressure in said delivery chamber corresponding to the preselected reduction of pressure effected in said supply chamber, (d) such reduction of the pressure in the delivery chamber acting on said piston member resulting in operation of the piston member to its said supply position.

11. A pressure-limiting valve device, as defined in claim 8, further characterized by pressure-maintaining valve mean comprising cooperating members, one carried by said piston member and another carried by said check valve means, said pressure-limiting valve means being operable by displacement of the piston member relative to the check valve means, incidental to a build-up of said actuating fluid pressure acting on said piston member to a degree exceeding said maximum pressure, to an open poition in which said actuating fluid pressure acting on said piston member is vented to atmosphere, said piston member being effective, upon restoration of said actuating fluid pressure on the piston member to said maximum pressure, for restoring said pressure-maintaining valve means to a closed position in which venting of actuating fluid pressure to atmosphere is terminated.

References Cited
UNITED STATES PATENTS 3,376,080    4/1968    Kettering et al. _____ 303—22

MILTON BUCHLER, Primary Examiner

J. J. McLAUGHLIN, Jr., Assistant Examiner

U.S. Cl. X.R.

303—40, 48